US 12,307,086 B2

United States Patent
Park

(10) Patent No.: US 12,307,086 B2
(45) Date of Patent: May 20, 2025

(54) METHOD AND USER TERMINAL FOR RECOMMENDING EMOTICONS BASED ON CONVERSATION INFORMATION

(71) Applicant: KAKAO CORP., Jeju-si (KR)

(72) Inventor: Yang Kyun Park, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/320,563

(22) Filed: May 19, 2023

(65) Prior Publication Data
US 2023/0376199 A1    Nov. 23, 2023

(30) Foreign Application Priority Data
May 23, 2022 (KR) .......................... 10-2022-0063042

(51) Int. Cl.
| | |
|---|---|
| G06F 3/048 | (2013.01) |
| G06F 3/0489 | (2022.01) |
| H04L 51/10 | (2022.01) |
| H04L 51/216 | (2022.01) |

(52) U.S. Cl.
CPC .......... *G06F 3/04897* (2013.01); *H04L 51/10* (2013.01); *H04L 51/216* (2022.05)

(58) Field of Classification Search
CPC .......... G06F 3/01; G06F 3/023; G06F 3/0482; G06F 3/042; G06F 3/167; G06F 40/30; H04L 51/02; H04L 51/043; H04L 51/07
See application file for complete search history.

(56) References Cited

U.S. PATENT DOCUMENTS

| | | | |
|---|---|---|---|
| 2016/0210116 A1* | 7/2016 | Kim ...................... | G06F 40/274 |
| 2017/0026254 A1* | 1/2017 | Adylov .................. | G06F 18/22 |
| 2017/0318061 A1* | 11/2017 | Zha ....................... | G06F 16/9537 |
| 2021/0216723 A1* | 7/2021 | Zhang ................... | G06F 18/214 |

FOREIGN PATENT DOCUMENTS

| | | |
|---|---|---|
| KR | 2016-0069456 | 6/2016 |
| KR | 2021-0078927 | 6/2021 |
| KR | 2021-0078928 | 6/2021 |
| KR | 10-2340244 B1 | 12/2021 |

OTHER PUBLICATIONS

Office Action received in corresponding Korean Application No. 10-2022-0063042 dated May 21, 2024.

* cited by examiner

*Primary Examiner* — Michael A Faragalla
(74) *Attorney, Agent, or Firm* — Knobbe, Martens, Olson, & Bear, LLP

(57) ABSTRACT

A method for recommending emoticons by a user terminal is proposed. The method may include receiving, from a server, a keyword database comprising information on keywords matched with emoticons and storing the received keyword database, and displaying conversation information in a chat room. The method may also include selecting at least some of conversation information as base conversation information according to a predetermined criterion, and selecting at least one keyword included in the keyword database as a basic keyword based on the base conversation information. The method may further include displaying a basic keyword interface corresponding to the basic keyword, receiving an input of selecting the basic keyword interface from a user, and displaying information on at least one emoticon matched with a basic keyword corresponding to the selected basic keyword interface.

13 Claims, 12 Drawing Sheets

FIG. 4

<Keyword database>

| Basic keyword | Keyword Identifier | Similar extended keyword | Responsive extended keyword |
|---|---|---|---|
| Birthday | K-027 | Gift, Cake, Celebration | - |
| Celebration | K-135 | Happy, Excited | - |
| Happy b-day | K-431 | Firework, Party, Birthday | - |
| Cake | K-428 | Birthday, Party | - |
| Hungry | K-816 | Lunch, Meal | Let's eat, What would you like to eat? |

<Update inforation>

| Basic keyword | Keyword Identifier | Similar extended keyword | Responsive extended keyword |
|---|---|---|---|
| Cherry blossom | K-845 | Spring, Yeouido, Date | - |

FIG. 6

<Keyword database>

| Basic keyword | Emoticon ID matched | Similar extended keyword | Responsive extended keyword |
|---|---|---|---|
| Birthday | E122, E121, A136, K994 | Gift, Cake, Celebration | - |
| Celebration | E122, E125, D138, B994 | Happy, Excited | - |
| Happy b-day | E121, A136, S123 | Firework, Party, Birthday | - |
| Cake | C133, C141, A134 | Birthday, Party | - |
| Hungry | H008, W113, A133, K361, L130 | Lunch, Meal | Let's eat, What would you like to eat? |

| Base conversation information | Basic keyword | Extended keyword |
|---|---|---|
| Today is Tom's birthday, right? Congratulations! | Birthday, Congratulations | Gift, Cake |
| Oh! congratulations, Tom | Congratulations | Happy, Excited |
| C133 | Cake | Birthday, Party |
| wow! happy b-day!! | Happy b-day | Firework, Party, Birthday |

FIG. 11

<Keyword database>

| Basic keyword | Keyword Identifier | Emoticon ID matched | Similar extended keyword | Responsive extended keyword |
|---|---|---|---|---|
| Birthday | K-027 | E122, E121, A136, K994 | Gift, Cake, Celebration | - |
| Celebration | K-135 | E122, E125, D138, B994 | Happy, Excited | - |
| Happy b-day | K-431 | E121, A136, S123 | Firework, Party, Birthday | - |
| Cake | K-428 | C133, C141, A134 | Birthday, Party | - |
| Hungry | K-816 | H008, W113, A133, K361, L130 | Lunch, Meal | Let's eat, What would you like to eat? |

<Update inforation>

| Basic keyword | Keyword Identifier | Emoticon ID matched | Similar extended keyword | Responsive extended keyword |
|---|---|---|---|---|
| cherry blossom | K-845 | F121, F311, P193 | Spring, Yeouido, Date | - |

METHOD AND USER TERMINAL FOR RECOMMENDING EMOTICONS BASED ON CONVERSATION INFORMATION

CROSS-REFERENCE TO RELATED APPLICATION

This application claims priority to and the benefit of Korean Patent Application No. 10-2022-0063042 filed on May 23, 2022, the disclosure of which is incorporated herein by reference in its entirety.

BACKGROUND

Technical Field

The present disclosure relates to a method for recommending emoticons by a user terminal based on conversation information of a chat service.

Description of Related Technology

Recently, chat services provided through smart phones, tablet computers, PCs, and the like are widely used. The chat services are not limited to text messages, and provide a function of using various emoticon-type messages.

SUMMARY

The present disclosure provides a method for recommending emoticons suitable for a user's conversation context by a user terminal.

The present disclosure provides a method for recommending emoticons suitable for a user's conversation context, without transmitting conversation information to a server, causing no concern about leakage of personal information.

In an aspect, there is provided a method for recommending emoticons by a user terminal, the method including: receiving, from a server, a keyword database comprising information on keywords matched with emoticons and storing the received keyword database; displaying conversation information in a chat room; selecting at least some of conversation information as base conversation information according to a predetermined criterion; selecting at least one keyword included in the keyword database as a basic keyword based on the base conversation information; displaying a basic keyword interface corresponding to the basic keyword; receiving an input of selecting the basic keyword interface from a user; and displaying information on at least one emoticon matched with a basic keyword corresponding to the selected basic keyword interface.

The method may further include: selecting an extended keyword based on the basic keyword using the keyword database; displaying an extended keyword interface corresponding to the extended keyword as well as the basic keyword interface; receiving an input of selecting the extended keyword interface from the user; and displaying information on at least one emoticon matched with an extended keyword corresponding to the selected extended keyword interface.

The keyword database may further include information on at least one of a similar relationship and a responsive relationship between a plurality of keywords, and the extended keyword may be selected based on information on at least one of the similar relationship and the responsive relationship relative to the basic keyword.

The predetermined criterion may be based on at least one of a type, a time of occurrence, and a speaker of the conversation information.

The predetermined criterion may be based on continuity of the conversation information, the continuity determined based on an interval between a time of occurrence of previous conversation information and a time of occurrence of next conversation information.

The method may further include receiving an input for using an emoticon from the user.

In the displaying of the information on the at least one emoticon, the information on the at least one emoticon may be displayed to replace the basic keyword interface in a region where the basic keyword interface is displayed.

The method may further include receiving an input of selecting at least one conversation information from among the conversation information from the user. In the selecting as the base conversation information, the at least one conversation information may be selected as the base conversation information.

The method may further include displaying, in the chat room, conversation information comprising a basic keyword corresponding to the selected basic keyword interface so that the conversation information is distinguishable from other conversation information.

The method may further include: receiving update information of the keyword database; and updating the keyword database with the update information.

The method may further include: selecting, as an additional suggested keyword, a keyword that is included in the base conversation information, used more than a predetermined number of times, but not included in the keyword database; and transmitting information on the additional suggested keyword to the server. The update information may include information on the additional suggested keyword.

The method may further include: transmitting information on a basic keyword corresponding to the selected basic keyword interface to the server; and receiving information on the at least one emoticon from the server.

In another aspect, there is provided a user terminal performing a method for recommending emoticons, the user terminal including: a memory; and a processor connected to the memory and configured to execute instructions stored in the memory. The processor may be further configured to: receive a keyword database comprising information on keywords matched with emoticons from the server and store the received keyword database; display conversation information on a chat room; select at least some of the conversation information as base conversation information according to a predetermined criterion; select at least one keyword included in the keyword database as a basic keyword based on the base conversation information; display a basic keyword interface corresponding to the basic keyword; receive an input of selecting the basic keyword interface from a user; and display information on at least one emoticon matched with a basic keyword corresponding to the selected basic keyword interface.

In yet another aspect, there is provided a method for recommending emoticons by a server, the method including: providing a keyword database comprising information on keywords matched with emoticons to a user terminal; providing conversation information to the user terminal; receiving information on selection, as a selected keyword, of at least one basic keyword selected based on the conversation information from the user terminal; and providing information on at least one emoticon matched with the selected keyword to the user terminal. As the basic keyword, at least one keyword included in the keyword database may be selected based on base conversation information in which at least some of the conversation information is selected according to a predetermined criterion in the user terminal. In response to the user terminal's providing basic keyword interfaces corresponding to the basic keyword, the selected keyword may be a basic keyword corresponds to a basic keyword interface selected by a user from among the basic keyword interfaces.

In the present disclosure, it is possible for a user terminal to recommend emoticons suitable for a user's conversation context.

In the present disclosure, it is possible for the user terminal to recommend emoticons suitable for the user's conversation context, without transmitting conversation information to a server, thereby causing no concern about leakage of personal information.

BRIEF DESCRIPTION OF THE DRAWINGS

FIG. 4 is a simplified representation of contents of a keyword database received and stored by a user terminal.

FIG. 6 is a simplified representation of a user terminal's selecting at least one keyword included in conversation information as a basic keyword and an extended keyword.

FIG. 11 is a simplified representation of contents of a keyword database received and stored by a user terminal according to another embodiment of the present disclosure.

DETAILED DESCRIPTION

Compared to texts, emoticons can add visual effects and express a user's abundant and various emotions more effectively. However, from the user, it is cumbersome to select an emoticon suitable for the user's intention among various emoticons. Recently, the types and number of emoticons provided by chat services have greatly increased. Therefore, it is literally impossible for the user to select an appropriate emoticon by brow sing through all provided emoticons.

In order to solve these problems, some chat services provide an emoticon search function with a keyword by matching emoticons with keywords. By using such an emoticon search function, it is possible to quickly and easily find and select an appropriate emoticon by searching for a desired emotion or situation with a keyword.

However, even in this search method using a keyword, it is inconvenient because the user needs to directly select an appropriate search keyword and input the selected keyword to proceed with the search. Therefore, there is an increasing need for a new method in order to address this cumbersome situation.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in describing embodiments disclosed herein, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

Each of the steps described above may be performed irrespective of the listed order, except when performed in the listed order due to a special causal relationship.

It should be noted that the terms "include" or "have" as used in the present disclosure are intended to denote the existence of any features, numerical values, steps, operations, constituent elements, parts, and combinations thereof described in the specification, but are not intended to preliminarily exclude the possibility of existence or addition of any one or more other features, numerical values, steps, operations, constituent elements, parts, and combinations thereof.

Hereinafter, the present disclosure will be described with reference to the accompanying drawings.

Figure 1:
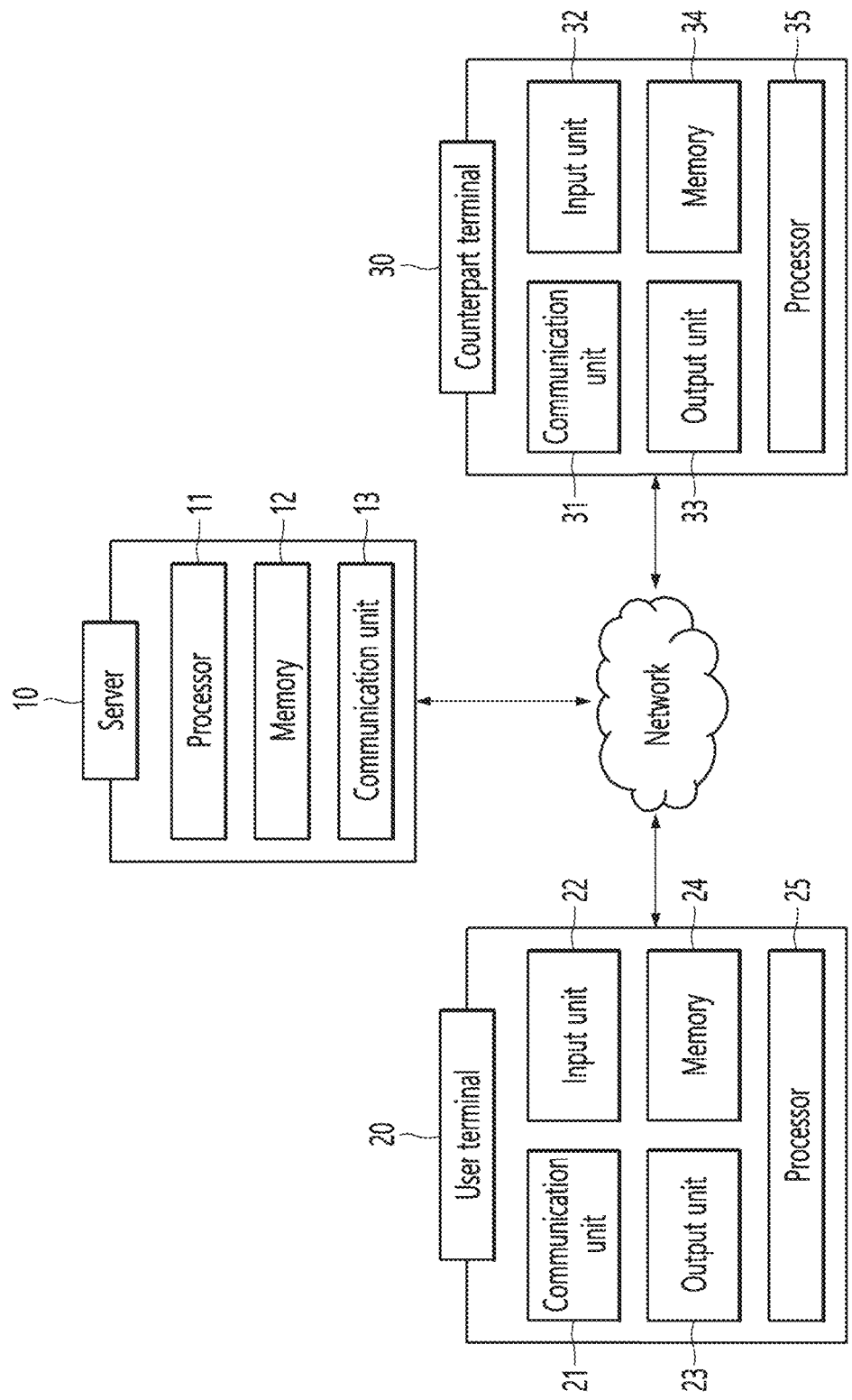
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10, a user terminal 20, and a counterpart terminal 30.

The network is not limited in communication method, and may include not only a communication method utilizing a communication network (e.g., a mobile communication network, wired Internet, wireless Internet, and broadcasting network) that the network may include, but also short-range wireless communication.

The server 10 may be implemented as a computer device or a plurality of computer devices that provide instructions, codes, files, contents, services, and the like. The server 10 may transmit and receive information through communication with the user terminal 20 and the counterpart terminal 30 via a network. Specifically, the server 10 may perform a function of transmitting chatting messages between the user terminal 20 and the counterpart terminal 30. The server 10 may operate an application related to a chat service.

The server 10 may include a processor 11, a memory 12 and a communication unit 13.

The processor 11 may control overall operations of the memory 12 and the communication unit 13 to provide a chat service through a chat room to the user terminal 20 and the counterpart terminal 30, and may execute an application related to a chat service.

The memory 12 serves as a storage medium, and may store a plurality of application programs running on the server 10, and data and instructions for operating the server 10. In one embodiment, the memory 12 may store an application related to a chat service.

This memory 12 may be provided in the form of any of various hardware storage devices, such as a Read-Only Memory (ROM), a Random Access Memory (RAM), an Electrically Erasable Programmable Read-Only Memory (EEPROM), a flash drive, and a hard drive, or may be provided in the form of a web storage.

The communication unit 13 may communicate with the user terminal 20 and the counterpart terminal 30 via a network in a wired or wireless manner.

The server 10 of the present disclosure may provide a chat service through a chat room to the user terminal 20 and the counterpart terminal 30. The chat service provided by the server 10 may be provided through a chat room.

Specifically, the server 10 provides a chat room in which messages can be transmitted and received between a user and a counterpart. Here, the messages includes a text, an emoticon, an image, a video, a voice, a file, contact information, location information, voting information of participants, and the like. The chat room may include "my chat room", in which only one participant participates, a general chat room in which two participants participate, and "group chat room" in which three or more participants participate. In addition, the chat room may be classified as any of various types according to topics, characteristics, qualifications to participate, and the like. However, the scope of the present disclosure is not limited by the type and nature of the chat room.

In addition, the server 10 of the present disclosure may provide a keyword database to the user terminal 20. The keyword database includes information on a plurality of keywords matched with a plurality of emoticons. At least one keyword may be matched with an emoticon. A keyword matched with an emoticon may be related to any one of a content, a theme, a character, a person, and a creator of the emoticon. The keywords may be used to search for desired emoticons by users, recommend emoticons to the users, or manage emoticons. The server 10 may include the keyword database in an application related to a chat service and provide the keyword database to the user terminal 20. This keyword database will be described in more detail with reference to FIG. 4 below.

The user terminal 20 may be a fixed terminal implemented as a computer device or may be a mobile terminal. For example, the user terminal 20 may include a smart phone, a mobile phone, a tablet PC, a computer, a laptop computer, a personal digital assistant (PDA), and the like. For example, the user terminal 20 may communicate with the server 10 or the counterpart terminal 30 via a network in a wireless or wired communication method.

The user terminal 20 may be used by a user. The user may refer to a user of the user terminal 20 or an account registered as a user in a chat service provided by the server 10. Therefore, transmitting by the server 10 certain information to a user may mean transmitting to the user terminal 20 through the user's account registered in the server 10.

The user terminal 20 may include a communication unit 21, an input unit 22, an output unit 23, a memory 24, and a processor 25.

The communication unit 21 may communicate with the server 10 or other terminals in a wired/wireless manner.

The input unit 22 may receive any of various types of information through a user's manipulation and input behavior. The input unit 22 may be a touch screen module, a keyboard, a mouse, a button, a camera, a stylus, a microphone, or the like.

The user terminal 20 may receive a user's interaction through the input unit 22. The Interaction means that the user manipulates the input unit 22 to input information reflecting the user's selection or intention to the user terminal 20. For example, the interaction may be touching a touch screen, clicking a mouse, typing a keyboard, inputting sound to a microphone, capturing an image by a camera, recognizing a motion by a motion sensor, and the like.

The output unit 23 may output various types of information. The output unit 23 may be a display device, a speaker, a vibration generating device, a tactile sensation generating device, and the like. In some cases, the output unit 23 may be a device (e.g., Bluetooth earphone) connected to the user terminal 20 through wired or wireless communication (e.g., short-range wireless communication such as Bluetooth) to receive and output signals.

The memory 24 serves as a storage medium, and may store a plurality of application programs running on the user terminal 20, and data and instructions for operating the user terminal 20. This memory 24 may be provided in the form of any of various hardware storage devices, such as a Read-Only Memory (ROM), a flash drive, and a hard drive, or may be provided in the form of a web storage.

In one embodiment, an application related to a chat service may be stored in the memory 24. In addition, the above-described keyword database may be stored in the memory 24.

The processor 25 may control overall operations of the communication unit 21, the input unit 22, the output unit 23, and the memory 24 to execute an application related to a chat service.

The user terminal 20 of the present disclosure may recommend emoticons to the user based on conversation information. Specifically, the user terminal 20 may receive and store the keyword database from the server 10. Further, the user terminal 20 may display conversation information in a chat room and select at least some of the conversation information as base conversation information according to a predetermined criterion. The user terminal 20 may select at least one keyword included in the base conversation information as a basic keyword by using the keyword database, and may display a basic keyword interface corresponding to the basic keyword. Here, the basic keyword interface may include information on the basic keyword corresponding thereto. The user terminal 20 may receive an input of selecting a basic keyword interface from a user, and display information on at least one emoticon matched with a basic keyword corresponding to the selected basic keyword interface.

Here, the conversation information refers to information such as messages transmitted and received through a chat service provided by the server 10. The conversation information may include a text, an emoticon, an image, a video, a file, contact information, location information, voting information of participants, and the like. The conversation information includes messages transmitted and received between the user terminal 20 and the counterpart terminal 30, messages transmitted and received between the user terminal 20 and the server 10, and messages sent from the user terminal 20 to itself.

The base conversation information refers to base information referred to by that the user terminal 20 to recommend emoticons to the user. The base conversation information may be some of the conversation information selected according to a predetermined criterion.

The basic keyword is a keyword of an emoticon used by the user terminal 20 to recommend emoticons to the user. The user terminal 20 recommends an emoticon matched with the basic keyword to the user. In the present disclosure, the basic keyword may be extracted and selected from the base conversation information. The basic keyword may correspond to some of a plurality of keywords included in the keyword database.

In the present disclosure, the user terminal may recommend emoticons to the user using a plurality of basic keywords. The user may select at least one basic keyword from among the plurality of basic keywords. In this way, the basic keyword selected by the user may be referred to as a selected keyword. The user terminal may recommend at least one emoticon corresponding to the selected keyword to the user.

A basic keyword interface is an interface used by the user to access any of emoticons classified by keywords in a process in which the user terminal 20 recommends an emoticon to the user. Each basic keyword interface corresponds to one basic keyword. When the user inputs an interaction for any one basic keyword interface, the user terminal 20 recommends an emoticon matched with the corresponding basic keyword.

The counterpart terminal 30 may be a terminal in a substantially same form as that of the user terminal 20 described above. The counterpart terminal 30 may also include a communication unit 31, an input unit 32, an output unit 33, a memory 34 and a processor 35. The same description of the configuration of the user terminal 20 applies to the counterpart terminal 30.

Figure 2:
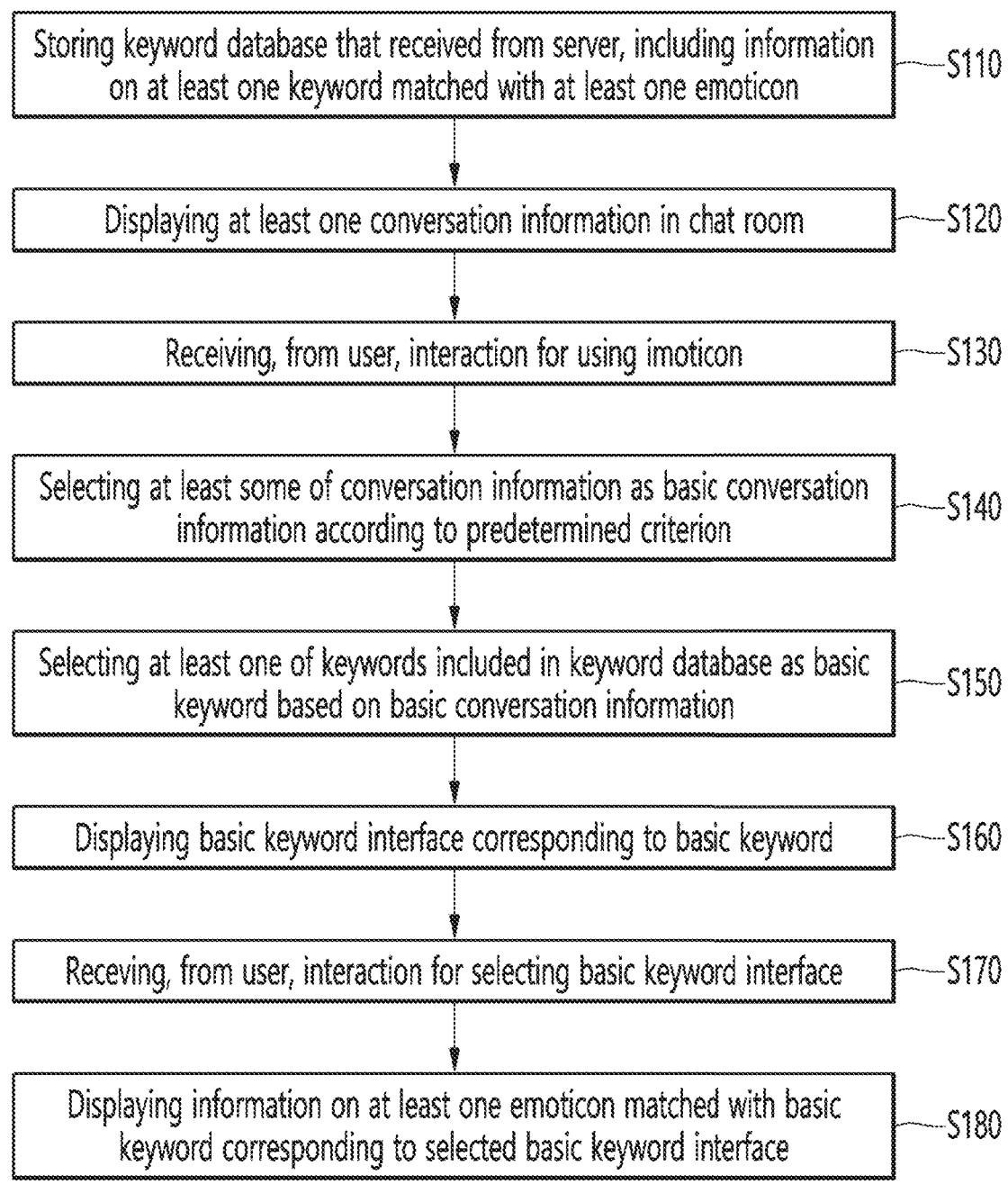
FIG. 2 is a flowchart illustrating a method for recommending emoticons based on conversation information by a user terminal according to an embodiment of the present disclosure.

Hereinafter, referring to FIG. 2, a method for recommending emoticons based on conversation information by the user terminal 20 of the present disclosure will be described.

Each operation described below is not necessarily limited to being performed in the listed order unless there is a special mention or causal relationship.

In operation S110, the user terminal 20 receives and stores a keyword database from the server 10. Here, the keyword database includes information on keywords matched with emoticons. Specifically, the keyword database may include keywords and keyword identifiers (IDs) matched with the keywords.

The user terminal 20 may download and install an application related to a chat service provided by the server 10 in the present disclosure. The keyword database is included in the application, so the keyword database may be downloaded and stored in the user terminal 20 as the user terminal 20 downloads and stores the application therein. In some cases, the user terminal 20 may download and store the keyword database in a process of updating then application.

The user terminal 20 may primarily download and store the keyword database, and then update the keyword database by receiving update information of the keyword database from the server 10. In doing so, the server 10 may additionally include, in the update information, a new keyword not included in the existing keyword database and a keyword identifier corresponding to the new keyword.

The new keyword may be a keyword not included in an existing keyword database but frequently used by users, a newly coined word, or a keyword that matches a newly registered emoticon. The user terminal 20 may update the keyword database to a latest version by receiving update information of the keyword database and adding a new keyword included in the update information to the existing keyword database.

The user terminal 20 may receive differencing data corresponding to a difference from a latest keyword database from the server 10 based on update information of the keyword database currently stored in the user terminal 20. For example, when the update information of the keyword database currently stored in the user terminal 20 is v1.716 and the update information of the latest keyword database is v1.719, the user terminal 20 may receive update information corresponding to v1.717, v1.718, and v1.719 as differencing data. In another example, if the update information of the keyword database currently stored in the user terminal 20 is the version of the Apr. 1, 2022, and update information of a latest keyword database is the version of Apr. 10, 2022, the user terminal 20 may receive update information from Apr. 1, 2022 to Apr. 10, 2022 as differencing data. According to the above method, it is possible for the user terminal 20 to update a keyword database by downloading only a relatively small amount of differencing data, without downloading a large amount of keyword database each time for update.

As such, if the user terminal 20 downloads and stores a keyword database and recommends an emoticon based on the keyword database, the user terminal 20 may be able to recommend emoticons based on conversation information by itself, without transmitting the conversation information to the server 10. If the user terminal 20 transmits the conversation information to the server 10, there is a concern about leakage of personal information. However, the above-described method is advantageous in high information security in that personal information does not leak from the user terminal 20 to the outside.

In operation S120, the user terminal 20 displays the conversation information in a chat room. The chat room is a virtual space in which a user participates to chat in a chat service, and the conversation information may be displayed subordinate to any one chat room. The conversation information may include messages in conversation, a speaker of each message, a time of occurrence of each message, and the like.

A chat room region for displaying conversation information may be formed beyond a display of the user terminal 20. That is, the chat room region may be formed to be larger than a size of the display of the user terminal 20, so that a user can search for the chat room region by scrolling the display of the user terminal 20. In operation S120, displaying of the conversation information in the chat room means not only that the conversation information is displayed in the chat room region output through the current display, but also that the conversation information can be searched by scrolling the display.

In operation S130, the user terminal 20 receives an input for using an emoticon from the user.

The user terminal 20 provides any of various interfaces through which the user can enter a message in a chat room. For example, the user terminal 20 may provide an interface through which the user can enter a message by entering a text through a keyboard input window, and may provide an interface through which the user can take a new picture or input a pre-stored picture. In addition, the user terminal 20 may provide an interface through which the user can use an emoticon. Operation S130 is performed when the user inputs an interaction to an interface through which a user can enter a message using an emoticon.

In operation S140, the user terminal 20 selects at least some of conversation information as base conversation information according to a predetermined criterion.

In the present disclosure, in order for the user terminal 20 to recommend an appropriate emoticon to the user, it is preferable to select some of conversation information displayed in the chat room as base conversation information according to a predetermined criterion, rather than the entire conversation information displayed in the chat room. In order for the user terminal 20 to recommend an appropriate emoticon to the user, it should be based on conversation context of a corresponding chat room at an environment and time where the emoticon is to be used. This is because a conversation context needs to be understood based only on conversation information following the conversation context.

Here, the above-described predetermined criterion may be determined in various ways, but it is preferable that recent conversation information is selected as the base conversation information. Based on the recent conversation information, the conversation context at a time the user wishes to use an emoticon may be determined.

The predetermined criterion may be determined based on a time of occurrence of conversation information. This is a method of selecting conversation information generated within a recent predetermined time period (e.g., the last 30 minutes) based on a current time as base conversation information. This is because recently generated conversation information will appropriately reflect a current conversation context.

In addition, the predetermined criterion may be determined based on continuity of conversation information. The continuity of conversation information may be determined based on an interval between a time of occurrence of previous conversation information before individual conversation information and a time of occurrence of subsequent conversation information after the individual conversation information. For example, if certain conversation information is generated within 15 minutes after previous conversation information thereof, it may be determined that the certain conversation information continues with the previous conversation information in continuity. Based on the continuity of the conversation information, a continuous conversation information group may be set. The user terminal 20 may select a recent continuous conversation information group as the base conversation information.

In addition, the predetermined criterion may be determined based on a type of conversation information. The type of conversation information may vary depending on any of various criteria. For example, conversation information may be classified as a different type depending on which one of a text, a photo, an emoticon, contact information, and link information the corresponding conversation corresponds to. If selecting the base conversation information is performed based on whether the type of conversation information is a text, only conversation information corresponding to the text type is selected as the base conversation information, excluding non-text conversation information such as pictures, emoticons, contact information, and link information.

In addition, the predetermined criterion may be determined based on a speaker of the conversation information. The speaker is a participant in the chat room, and one or more speakers each serving as a selective criterion may be set. For example, when participants A, B, C, and D participate in a chat room, only conversation information by B may be selected as base conversation information according to a preset criterion.

The above-described predetermined criterion and detailed criteria may be provided to the user terminal 20 after the server 10 determines the contents and criteria in advance. In some cases, it is also possible for a user to set the predetermined criterion and the detailed criteria according to the user's preference through the user terminal 20.

In operation S150, the user terminal 20 selects at least one keyword included in the base conversation information as a basic keyword, by using the keyword database.

The user terminal 20 may search the base conversation information to search whether the keywords included in the keyword database are included. If the keywords are included in the base conversation information according to a search result, at least one of the keywords may be selected as a basic keyword.

When a plurality of keywords is included in the base conversation information, at least one keyword may be selected therefrom as a basic keyword according to a predetermined criterion. For example, the predetermined criterion may be the number of times of appearance in the base conversation information. That is, it is a method of selecting only a keyword appearing in the base conversation information a preset number of time or more as a basic keyword. In some cases, the minimum number or maximum number of times of appearance of a basic keyword to be selected may be determined.

In a process in which the user terminal 20 searches whether the keywords are included in the base conversation information, various allowance criteria may be applied. For example, the user terminal 20 may perform the search based on whether a word perfectly matched with a keyword included in the keyword database is included in the base conversation information. However, in some cases, the user terminal 20 may perform the search based on whether a word semantically identical to a keyword included in the keyword database is included in the based conversation information in consideration of spaces, typos, and spelling errors.

In operation S160, the user terminal 20 displays a basic keyword interface corresponding to the basic keyword.

Each basic keyword interface may correspond to one basic keyword. Accordingly, the number of basic keyword interfaces displayed may be equal to the number of basic keywords selected.

Each basic keyword interface may be displayed in the form of a button or card that is selectable through an interaction of touching the display of the user terminal 20. Each basic keyword interface includes information on a basic keyword corresponding thereto. That is, a basic keyword corresponding to an interface displayed in the form of a button or a card may be displayed. In addition, an emoticon matched with the basic keyword corresponding to the interface displayed in the form of a button or a card may be displayed. In this case, the emoticon displayed may be an emoticon provided by the user terminal 20 from the server 10 by transmitting a keyword identifier corresponding to a basic keyword to the server 10.

The basic keyword interface may be displayed in a region where a keyboard input window is displayed on the display of the user terminal 20. Therefore, in operation S160, the user terminal 20 may display the basic keyword interface in the region, without displaying the keyboard input window.

The basic keyword interface may be displayed in plural. A plurality of basic keyword interfaces may be displayed in an array form on the display. For example, the plurality of basic keyword interfaces may be displayed in a 2×4 array or a 3×5 array.

In operation S170, the user terminal 20 receives an input of selecting a basic keyword interface from the user.

The user may select a basic keyword interface through an interaction such as touching a basic keyword interface displayed in operation S160. Here, a method for interaction input by the user may change variously. Here, a basic keyword corresponding to the basic keyword interface selected by the user may be a selected keyword.

In operation S180, the user terminal 20 displays information on at least one emoticon matched with the basic keyword corresponding to the selected basic keyword interface.

The basic keyword interface selected by the user in operation S170 corresponds to the basic keyword. The user terminal 20 may transmit a keyword identifier of the selected basic keyword to the server 10. The server 10 may provide the user terminal 20 with emoticon information corresponding to the keyword identifier received from the user terminal 20. To this end, the server 10 may have a database including keyword identifiers and emoticon information corresponding thereto.

The emoticon information provided by the server 10 to the user terminal 20 may include at least one of an emoticon identifier (ID), emoticon thumbnail (preview) information, emoticon image information, and dynamic emoticon information.

The emoticon thumbnail (preview) information refers to information provided for a user to preview an image of an emoticon in order to select an emoticon to use. Generally, the emoticon thumbnail information may have a smaller capacity than that of emoticon image information.

The emoticon image information refers to information including an image displayed at a time when an emoticon is used in a chat room. The dynamic emoticon information refers to image information on a moving emoticon, not information on a static emoticon. For example, the dynamic emoticon information may be a GIF (Graphics Interchange Format) file. The emoticon image information may include both dynamic emoticon information and static emoticon information.

For example, the user terminal 20 may receive an emoticon identifier (ID) as emoticon information from the server 10. In this case, the user terminal 20 may request emoticon thumbnail information from the server 10 again using the emoticon identifier (ID) and display the emoticon thumbnail information. In some cases, the user terminal 20 may store emoticon thumbnail information matched with the emoticon identifier (ID) in advance, and may load and display the stored emoticon thumbnail information using the provided emoticon identifier (ID).

In another example, the user terminal 20 may receive both an emoticon identifier (ID) and emoticon thumbnail information as emoticon information from the server 10. In this case, the user terminal 20 may display the received emoticon thumbnail information.

According to the above method, an emoticon matched with a basic keyword may be displayed in a region where a keyboard input window is displayed on the display of the user terminal 20. Therefore, in operation S180, the user terminal 20 may display the emoticon in the region, without displaying the keyboard input window. When it comes to the emoticon, the basic keyword interface displayed in operation S160 is changed into the emoticon displayed at the same position in response to the user's input in operation S170.

An emoticon matched with a basic keyword may be displayed as emoticon thumbnail information. The emoticon thumbnail information may be displayed in the form of a static image or a dynamic image. Emoticons may be displayed in a predetermined number in consideration of the size of a display region. For example, even if there are 12 emoticons matched with one basic keyword in the keyword database, only up to 8 emoticons may be displayed. When some of the multiple emoticons matched are selected and displayed, the emoticons may be selected in consideration of popularity of the emoticons, the relationship between the emoticons and the basic keyword, and the user's previous history of use of the emoticons.

The emoticons matched with the basic keyword may be displayed in the form to be selectable by an interaction of touching the display of the user terminal 20. Therefore, when a user selects a displayed emoticon, the corresponding emoticon may be displayed in the form of a message entered in the chat room. In some cases, the selected emoticon may not be immediately displayed in the chat room, but may be displayed in the chat room in a manner in which a preview of the emoticon is first displayed and then the emoticon itself is displayed in response to receiving a user's emoticon transmission input.

Figure 3:
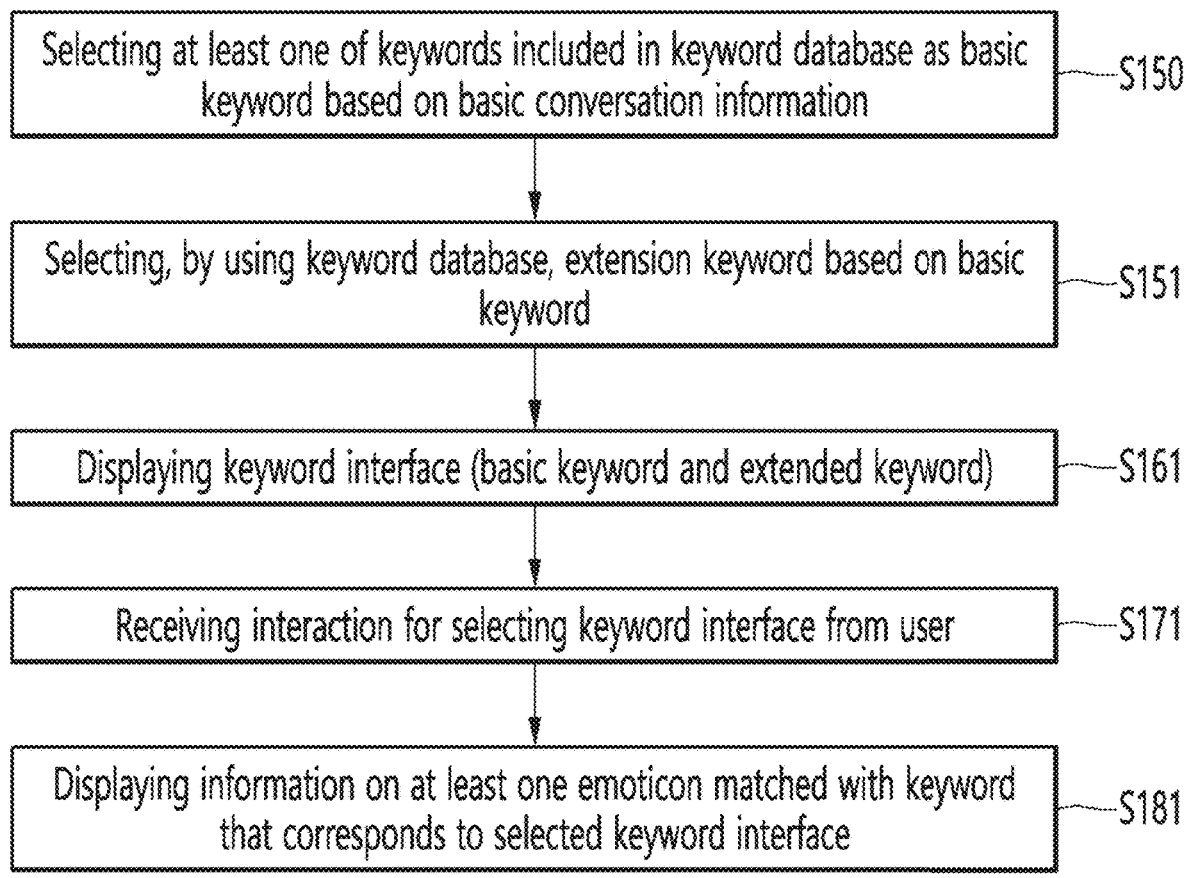
FIG. 3 is a flowchart illustrating a method for recommending emoticons based on conversation information by a user terminal according to another embodiment of the present disclosure.

Hereinafter, with reference to FIG. 3, another method for recommending emoticons based on conversation information by the user terminal 20 of the present disclosure will be described.

Operation S150 is the same as that described with reference to FIG. 2. Thus, a description of operation S150 will be omitted herein.

In operation S151, the user terminal 20 selects an extended keyword based on a basic keyword using the keyword database.

The extended keyword refers to a keyword having predetermined relevance to the basic keyword. For example, the extended keyword may be in a similar, opposite, or responsive relationship to the basic keyword. Such a relationship between the extended keyword and the basic keyword may be included in the keyword database. That is, in operation S151, the user terminal 20 searches for the basic keyword in the keyword database stored in advance, and selects an extended keyword based on the basic keyword.

When a plurality of extended keywords is found in the keyword database, only some of the plurality of extended keywords may be finally selected as extended keywords. The number of extended keywords selectable by the user terminal 20 may be predetermined. The user terminal 20 may select some extended keywords by any of various predetermined criteria.

In operation S161, the user terminal 20 displays a keyword interface.

Operation S161 is similar to operation S160 described above. For convenience of explanation, a detailed description of some of the same contents as operation S160 will be omitted in explaining operation S161.

The keyword interface displayed in operation S161 includes a basic keyword interface and an extended keyword interface. As described above, the basic keyword interface corresponds to a basic keyword. Meanwhile, the extended keyword interface corresponds to an extended keyword. The basic keyword interface and the extended keyword interface may be displayed in the same form. However, in some cases, the basic keyword interface and the extended keyword interface may be displayed in the forms distinguished from each other.

In operation S161, a plurality of keyword interfaces may be displayed. Among the plurality of keyword interfaces, the number of basic keyword interfaces and the number of extended keyword interfaces may be flexibly determined according to a circumstance. A method for arrangement of the basic keyword interfaces and the extended keyword interfaces may also be flexibly determined according to a circumstance.

In operation S171, the user terminal 20 receives an input of selecting a keyword interface from the user.

Operation S171 is similar to operation S170 described above. For convenience of explanation, a detailed description of some of the same contents as operation S170 will be omitted in explaining operation S171. In operation S171, the user may select any one of the basic keyword interface and the extended keyword interface according to his or her preference.

In operation S181, the user terminal 20 displays information on at least one emoticon matched with a keyword corresponding to the selected keyword interface.

Operation S181 is similar to operation S180 described above. For convenience of explanation, a detailed description of some of the same contents as operation S180 will be omitted in explaining operation S181.

The keyword interface selected by the user in operation S171 corresponds to a basic keyword or an extended keyword. This depends on which keyword interface the user selects in operation S171. In operation S181, an emoticon matched with the basic keyword or an emoticon matched with the extended keyword is displayed according to the user's selection.

According to this method, the user terminal recommends an emoticon suitable for the user's current conversation context, without transmitting conversation information to the server, and therefore, there is no concern about leakage of personal information.

Hereinafter, with reference to FIGS. 4 to 10, a method for recommending emoticons based on conversation information by the user terminal 20 described above with reference to FIGS. 2 and 3 will be described with specific embodiments.

FIG. 4 is a simplified representation of the contents of the keyword database received and stored by the user terminal 20 in operation S110.

Referring to FIG. 4, the keyword database may include basic keywords, keyword identifiers (IDs) matched with the basic keywords, and extended keywords. The basic keywords may be related to any one of a content, a subject, a character, a person, and a creator of the emoticon. The keyword identifier (ID) is identification information (ID) matched with the basic keyword. The user terminal 20 may transmit a keyword identifier (ID) to the server 10 to provide information on a keyword selected by the user. In addition, the server 10 may provide the user terminal 20 with information on at least one emoticon corresponding to the received keyword identifier (ID). The extended keyword refers to a keyword having predetermined relevance to the basic keyword.

The extended keyword may include a similar extended keyword and a responsive extended keyword, which are matched with one basic keyword. The similar extended keyword refers to a keyword having a similar meaning to that of the basic keyword, frequently used together with the basic keyword, or capable of replacing the basic keyword. The responsive extended keyword refers to a keyword mainly used as a reply (response) to the basic keyword. For any one basic keyword, either or both similar extended keywords and responsive extended keywords may be designated.

For example, as shown in FIG. 4, if there is a basic keyword "birthday" in a keyword database, the keyword identifier matched therewith may be K-027 and similar extended keywords therefor may be "gift", "cake", and "congratulations". In addition, a responsive extended keyword matched therewith may not be additionally designated.

Also, as shown in FIG. 4, if there is a basic keyword "hungry" in the keyword database, a keyword identifier matched therewith may be K-816, and similar extended keywords therefor may include "lunch" and "meal" and responsive extended keywords therefor may include "Let's eat" and "What would you like to eat?."

The user terminal 20 may primarily download and store the keyword database, and then update the keyword database by receiving update information of the keyword database from the server 10. The update information may also include a basic keyword, a keyword identifier (ID) matched with the basic keyword, and an extended keyword/

For example, as shown in FIG. 4, a basic keyword "cherry blossom" may be added as a new keyword to the update information. When such update information is received, the user terminal 20 may update the keyword database so that the basic keyword "cherry blossom" and other information corresponding thereto can be added.

This new keyword may be a keyword not included in the existing keyword database but frequently used by users, a newly coined word, or a keywords matching a newly registered emoticon.

In some cases, if there is a keyword used more than a predetermined number of times in existing conversation information but not included in the keyword database, the user terminal 20 may suggest the keyword to the server 10 as an additional suggested keyword. The user terminal 20 may select the additional suggested keyword by searching the entire conversation information or by searching the base conversation information. Specifically, the user terminal 20 may receive information on the number of times of appearance of each keyword from the server 10, and the user terminal 20 may select an additional suggested keyword based on the received information.

The user terminal 20 transmits the selected additional suggested keyword to the server 10. However, in this process, a problem arises in that the user terminal 20 transmits certain keywords used in the conversation to the server 10. The transmission of the certain keywords by the user terminal 20 to the server 10 may result in leakage of personal information. Therefore, in some cases, the user terminal 20 may perform a process of verifying whether the additional suggested keyword is a word that possibly leaks personal information. For example, if it is determined that the selected additional suggested keyword is a term related to a person's name, a company name, an organization name, a technology, and sales, the user terminal 20 may not transmit the additional suggested keyword to the server 10. In addition, even when it is determined that the selected additional suggested keyword is a term related to personal information (personally identifiable information) of the user or a counterpart, the user terminal 20 may not transmit the additional suggested keyword to the server 10.

The server 10 may review additional suggested keywords suggested by a plurality of user terminals by this method and may add at least some of the additional suggested keywords to the keyword database. Accordingly, the server 10 may be able to add a word frequently used but not previously included in a keyword database as a keyword in the keyword database, and may quickly include a newly coined word or buzzword used frequently as a keyword in the keyword database.

Figure 5:
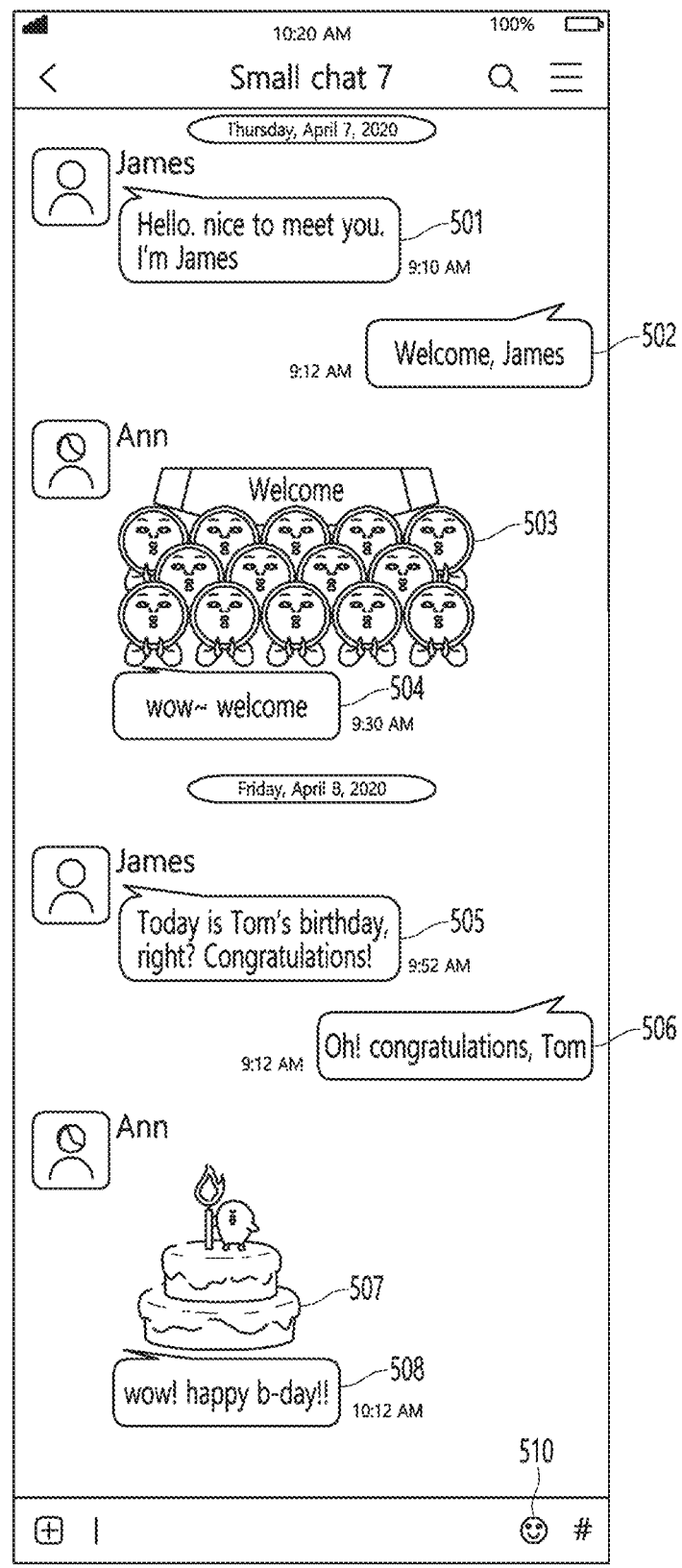
FIG. 5 illustrates a screen on which a user terminal displays conversation information in a chat room.

FIG. 5 shows a screen on which the user terminal 20 displays conversation information in a chat room in operation S120.

Referring to FIG. 5, it can be seen that a plurality of items of conversation information 501 to 508 is displayed in a chat room. The plurality of items of conversation information may include information on a time point (date and time) and talker of each message.

Referring to FIG. 5, the user terminal 20 may display an interface 510 through which the user may use emoticons. The user terminal 20 may determine in advance whether or not to recommend a keyword-related emoticon based on conversation information selected according to a predetermined criterion, which will be described later. If the user terminal 20 is capable of recommending a keyword-related emoticon, the interface 510 may be displayed as an icon indicating that a keyword-related emoticon can be recommended. This interface 510 may be referred to as a so-called hint icon.

When the user touches this interface 510, the user terminal 20 may receive an input of using an emoticon (which corresponds to operation S130).

Thereafter, the user terminal 20 selects at least some of the conversation information as base conversation information according to a predetermined criterion (which corresponds to operation S140).

For example, the predetermined criterion may be conversation information having occurred within the last 30 minutes. Then, in the case of FIG. 5, the current time is 10:20 AM, so conversation information 505, 506, 507, and 508 will be selected as base conversation information.

If the predetermined criterion is a recent continuous conversation information group, a criterion for continuity may be a time interval of 15 minutes from previous conversation information. If so, in the case of FIG. 5, the conversation information 506, 507, and 508 will be selected as base conversation information. In the case of the conversation information 505, a time interval from the subsequent conversation information 506 is 18 minutes that exceeds the criterion of 15 minutes, and thus, the conversation information 505 may not be included in the recent continuous conversation information group.

The predetermined criterion may be that a type of conversation information is an emoticon. If so, in the case of FIG. 5, the conversation information 503 and 507 will be selected as base conversation information.

If it is, a predetermined criterion may be that the talker of the conversation information is "James". Then, in the case of FIG. 5, the conversation information 501 and 505 will be selected as base conversation information.

The predetermined criterion in operation S140 may be a combination of two or more of the predetermined criteria in the above-described examples.

Hereinafter, for convenience of explanation, it is assumed that the predetermined criterion is conversation information generated within the last 30 minutes and the conversation information 505, 506, 507, and 508 are selected as base conversation information accordingly.

FIG. 6 is a simplified representation in which the user terminal 20 selects at least one keyword included in the base conversation information as a basic keyword and an extended keyword by using the keyword database in operations S150 and S151.

As described above, in the case of FIG. 5, the conversation information 505, 506, 507, and 508 are selected as base conversation information. The user terminal 20 searches the base conversation information to search whether a keyword included in the keyword database is included. As a result of the search, it can be seen that basic keywords such as "birthday", "congratulations", "cake", and "happy b-day" are included in the base conversation information. Like the conversation information 507, if the base conversation information is an emoticon C133, a keyword matched with the corresponding emoticon may be found as a basic keyword.

Then, the user terminal 20 searches for extended keywords based on the selected basic keywords using the keyword database. As a result of the search, it can be seen that the keyword database includes the extended keywords "gift", "cake", "happy", "excited", "birthday", "party", and "firework". A keyword ("cake", "birthday") corresponding to both the basic keyword and the extended keyword may be selected as only one of the basic keyword and extended keyword.

Hereinafter, for convenience of explanation, it is assumed that a keyword ("cake", "birthday") corresponding to both the basic keyword and the extended keyword is selected as a basic keyword.

Figure 7:
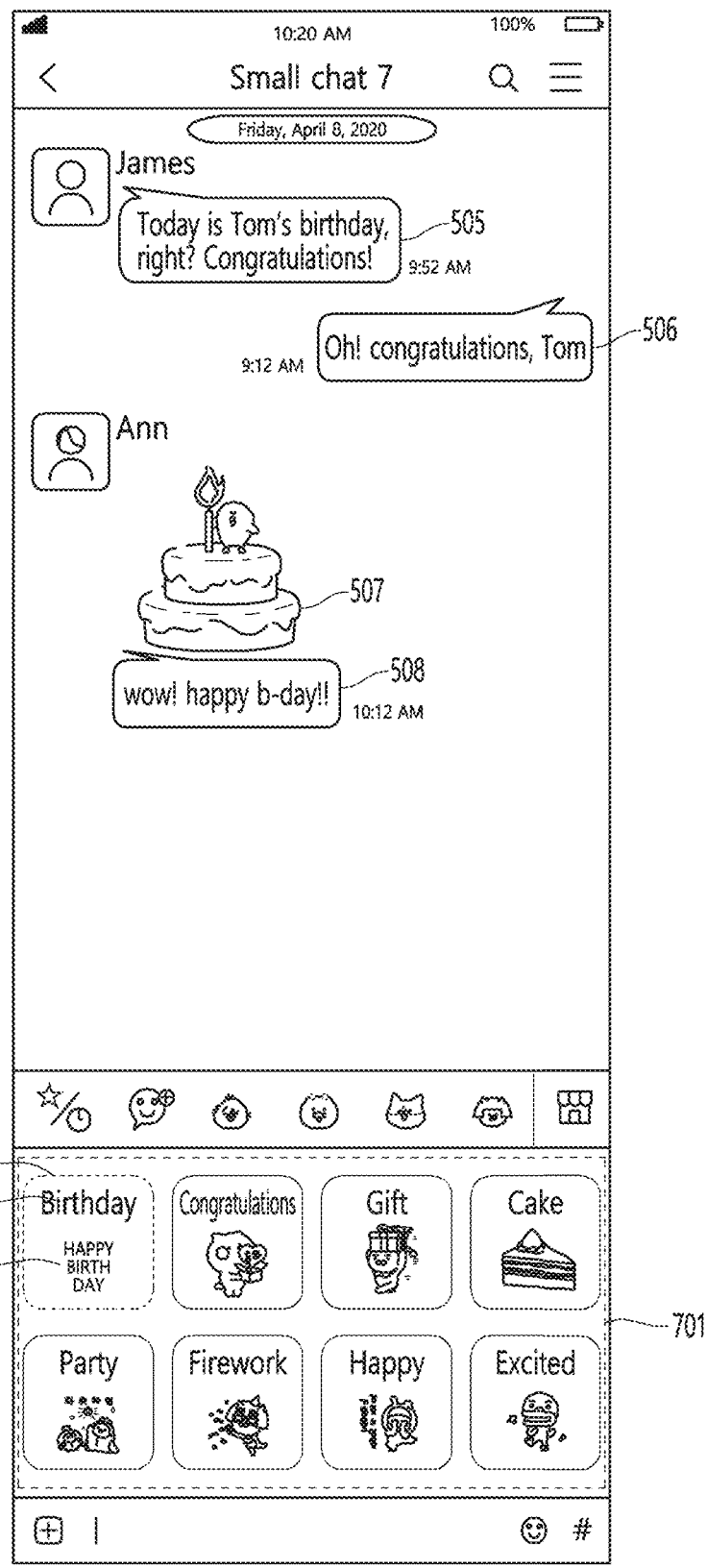
FIG. 7 illustrates a screen on which a user terminal displays a basic keyword interface corresponding to a basic keyword and an extended keyword interface corresponding to an extended keyword.

FIG. 7 illustrates a screen on which the user terminal 20 displays a basic keyword interface corresponding to a basic keyword and an extended keyword interface corresponding to an extended keyword in operations S160 and S161.

Referring to FIG. 7, it can be seen that basic keyword interfaces corresponding to basic keywords such as "birthday", "celebrations", "cake" and "happy b-day" are displayed. In addition, it can be seen that extended keyword interfaces corresponding to "party", "firework", "happy" and "excited" are displayed.

The keyword interface may be displayed in the form of a button or a card that are selectable through an interaction of touching the display of the user terminal 20. In the keyword interface, information on a corresponding keyword and a matched emoticon may be displayed together. When there are a plurality of emoticons matched with a keyword, at least one of the plurality of emoticons may be selected and displayed or a predetermined representative emoticon may be selected and displayed. Referring to FIG. 5, it can be seen that a keyword 711 of "birthday" and an emoticon 712 matched with the keyword of "birthday" are displayed on a keyword interface 710.

The keyword interface may be displayed in a region 701 where a keyboard input window is displayed on the display of the user terminal 20. Keyword interfaces may be displayed in an array form. Referring to FIG. 7, it can be seen that the keyword interfaces are displayed in a 2×4 array.

Thereafter, the user terminal 20 receives an input of selecting a keyword interface (which corresponds to operations S170 and S171). Hereinafter, it will be described in the assumption that a user has selected the keyword interface 710.

Figure 8:
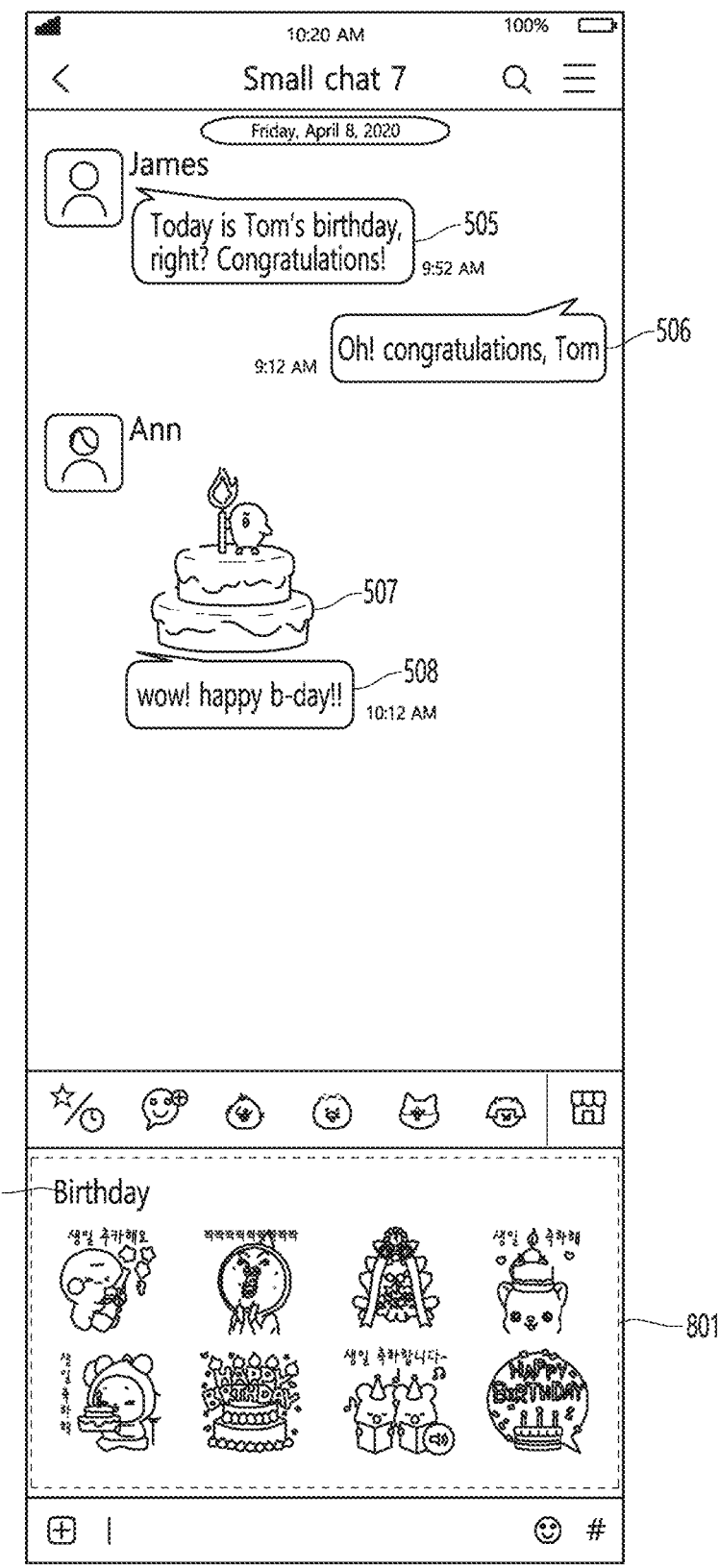
FIG. 8 illustrates a screen on which a user terminal displays information on at least one emoticon matched with a basic keyword corresponding to a selected basic keyword interface.

FIG. 8 illustrates a screen on which the user terminal 20 displays information on at least one emoticon matched with a basic keyword corresponding to a selected basic keyword interface in operations S180 and S181.

Referring to FIG. 8, it can be seen that an emoticon matched with the keyword 802 of "birthday" is displayed in the user terminal 20 in response to the user's selecting the keyword interface 710.

The keyword interface may be displayed in a region 801 where a keyboard input window is displayed on the display of the user terminal 20. Keyword interfaces may be displayed in an array form. Referring to FIG. 8, it can be seen that keyword interfaces are displayed in a 2×4 array.

Figure 9:
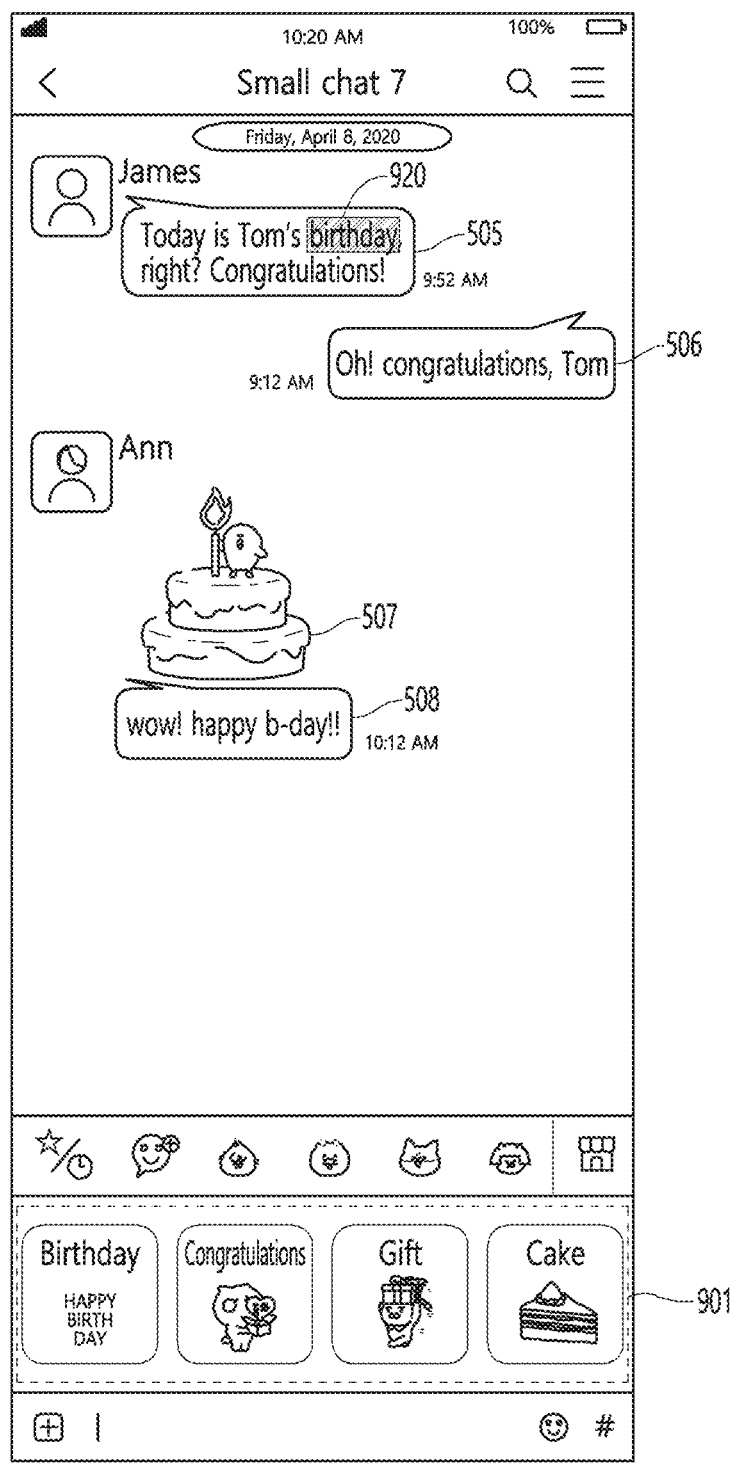
FIG. 9 illustrates a screen of a modified embodiment in which a user terminal displays a basic keyword interface corresponding to a basic keyword and an extended keyword interface corresponding to an extended keyword.

FIG. 9 illustrates a screen of a modified embodiment in which the user terminal 20 displays a basic keyword interface corresponding to a basic keyword and an extended keyword interface corresponding to an extended keyword.

The user terminal 20 may receive an input of selecting any one of the conversation information displayed in a chat room. In some cases, the user terminal 20 may receive an input of selecting a keyword included in the corresponding conversation information as well as any one conversation information. In order to receive the input of selecting a keyword, the user terminal 20 may distinguishably mark a keyword included in the conversation information by using a keyword database. In addition, when the user selects a certain keyword, the user terminal 20 may distinguishably mark the selected keyword.

Referring to FIG. 9, it is illustrated that the user selects the conversation information 505 and a keyword 920 of "birthday". In addition, it can be seen that the keyword 920 of "birthday" is highlighted.

Thereafter, the user terminal 20 may select conversation information selected by a user as base conversation information. Therefore, the user terminal 20 recommends an emoticon based on the conversation information selected by the user.

Referring to FIG. 9, it can be seen that only the conversation information 505 selected by the user is selected as base conversation information and a keyword interface 901 is displayed accordingly.

According to this method, the user is able to accurately select conversation information to be selected as base conversation information by his or herself, and therefore, the user terminal 20 may recommend emoticons customized to the user's selection.

Figure 10:
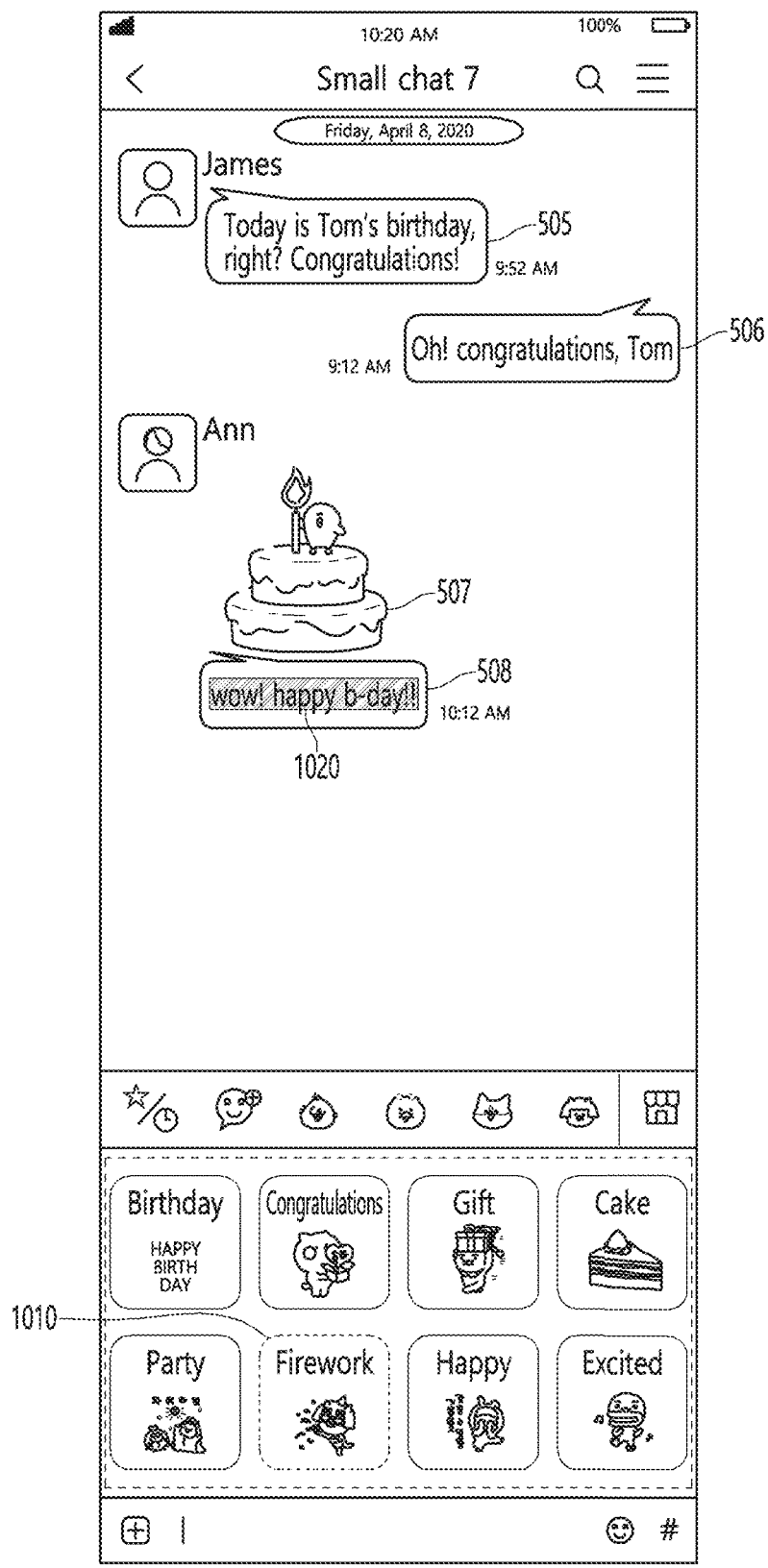
FIG. 10 illustrates a screen of a modified embodiment in which a user terminal displays information on at least one emoticon matched with a keyword corresponding to a selected keyword interface.

FIG. 10 illustrates a screen of a modified embodiment in which the user terminal 20 displays information on at least one emoticon matched with a keyword corresponding to a selected keyword interface.

When an interaction for selecting a keyword interface is received from a user, the user terminal 20 may display conversation information including a basic keyword corresponding to the selected keyword interface in a distinguishable way from other conversation information.

Here, displaying the conversation information in a distinguishable way may be implemented variously. For example, the corresponding conversation information may be highlighted, or the corresponding conversation information may be with a shake effect added. In some cases, the font or font size of the corresponding conversation information may be displayed to be different from others.

Referring to FIG. 10, it is illustrated a screen of the user terminal 20 in a case where a user selects a keyword interface 1010 of "firework". The extended keyword "firework" is based on a basic keyword "happy b-day". Therefore, the conversation information 508 including the basic keyword 1020 of "happy b-day" may be displayed in a distinguishable way from other conversation information.

According to this method, it is possible to easily find out which conversation information the keyword interface selected by the user is based on.

FIG. 11 is a simplified representation of another form of the keyword database described in FIG. 4. Referring to FIG. 11, another form of the keyword database will be described.

Unlike the description provided with reference to FIG. 4, information on emoticons matched with basic keywords may be further included in the keyword database, as shown in FIG. 11. The information on the emoticons may be, for example, emoticon identifiers (IDs). One or more emoticons may be matched with a basic keyword. Specifically, referring to FIG. 11, it can be seen that E122, E121, A136, and K994 are stored as emoticon IDs matched with the basic keyword "birthday".

By using a keyword database including information on emoticons matched with a basic keyword, the user terminal 20 may be able to check the emoticons matched with the basic keyword, without requesting which emoticon matches the selected basic keyword from the server 10. Specifically, the user terminal 20 may display thumbnails of the emoticons matched with the basic keyword or a list of recommended emoticons, without a separate request to the server 10.

In this case, information on a matched emoticon may be included in update information that the user terminal 20 receives from the server 10 to update the keyword database. Specifically, referring to FIG. 11, it can be seen that F121, F311, and P193 are stored as emoticon IDs matched with "cherry blossoms," which is a basic keyword included in update information.

Figure 12:
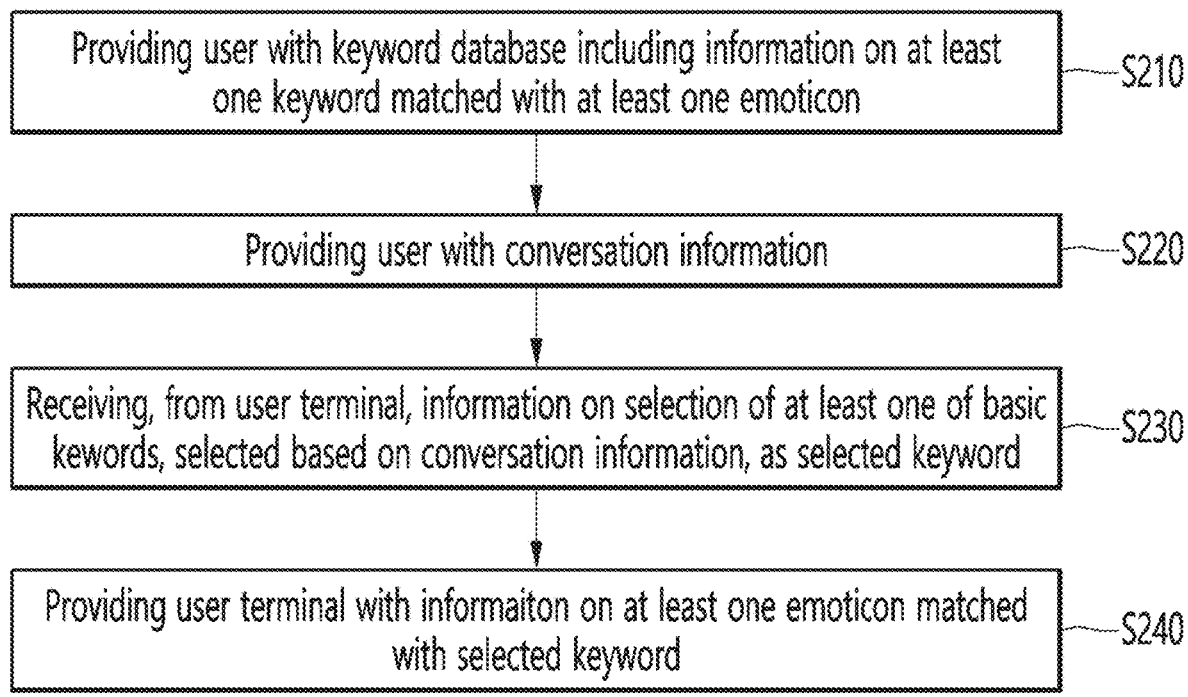
FIG. 12 is a flowchart illustrating a method for recommending emoticons based on conversation information by a server according to an embodiment of the present disclosure.

Hereinafter, referring to FIG. 12, a method for recommending emoticons based on conversation information by the server 10 of the present disclosure will be described.

A method for recommending emoticons by the server 10, which are described below, corresponds to a method for recommending emoticons by the user terminal 20 based on conversation information with reference to FIGS. 2 and 3. Therefore, for convenience of explanation, some redundant descriptions will be omitted.

In operation S210, the server 10 provides a keyword database to the user terminal. Here, the keyword database includes information on keywords matched with emoticons. Operation S210 performed by the server 10 corresponds to operation S110 performed by the user terminal 20.

In operation S220, the server 10 provides conversation information to the user terminal 20. The server 10 may receive the conversation information from the counterpart terminal and provide the received conversation information to the user terminal 20. Operation S220 performed by the server 10 corresponds to operation S120 performed by the user terminal 20.

In operation S230, the server 10 receives information on selection of at least one of basic keywords as a selected keyword from the user terminal 20. The basic keyword is selected based on the conversation information provided in operation S220. Operation S230 performed by the server 10 is performed in response to operation S170.

Specifically, as the basic keyword, at least one keyword included in the keyword database is selected based on base conversation information. Here, as the base conversation information, at least some of the conversation information is selected by the user terminal 20 according to a predetermined criterion.

Specifically, the selected keyword is a keyword selected by the user in the user terminal 20 from among a plurality of basic keywords. When the user terminal 20 provides basic keyword interfaces corresponding to basic keywords, a basic keyword corresponding to a basic keyword interface selected by a user among the basic keyword interfaces becomes a selected keyword.

In operation S240, the server 10 provides information on at least one emoticon matched with the selected keyword to the user terminal 20. This emoticon may be displayed in a chat room of the user terminal 20.

According to this method, the server 10 may recommend emoticons to the user terminal 20 and provide an emoticon selected by the user, without separately receiving base conversation information for recommending emoticons from the user terminal 20.

The technical features disclosed in each embodiment of the present disclosure are not limited to a corresponding embodiment, and unless incompatible with each other, the technical features disclosed in each embodiment may be applied in combination to other embodiments.

Therefore, in each embodiment, each technical feature is mainly described, but each technical feature may be merged and applied to each other unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for recommending emoticons by a user terminal, the method comprising:
    receiving, by the user terminal from a server, a keyword database comprising a plurality of keyword identifiers and a plurality of basic keywords, the plurality of keyword identifiers respectively corresponding to the plurality of basic keywords, each of the plurality of basic keywords corresponding to one or more emoticons of a plurality of emoticons stored in the server;
    storing the received keyword database in a memory of the user terminal;
    displaying conversation information in a chat room of the user terminal;
    selecting at least some of the conversation information as base conversation information based on a predetermined criterion;
    comparing the base conversation information with the plurality of basic keywords of the keyword database to select a basic keyword of the plurality of basic keywords corresponding to the base conversation information;
    retrieving a keyword identifier, corresponding to the selected basic keyword, from the plurality of keyword identifiers of the plurality of keyword identifiers of the keyword database stored in the memory of the user terminal;
    displaying a basic keyword interface corresponding to the selected basic keyword;
    displaying an extended keyword interface corresponding to an extended keyword having predetermined relevance to the basic keyword;
    receiving an input of selecting at least one of the basic keyword interface or the extended keyword interface from a user;
    transmitting, to the server, a request for at least one emoticon associated with the at least one of the basic keyword interface or the extended keyword interface, without transmitting the conversation information to the server;
    receiving, from the server, the at least one emoticon; and
    displaying the received at least one emoticon on the user terminal as a recommendation to the user.

2. The method of claim 1, wherein:
    the keyword database further comprises information on at least one of a similar relationship or a responsive relationship between a plurality of keywords,
    the extended keyword is selected based on the information on at least one of the similar relationship or the responsive relationship to the basic keyword.

3. The method of claim 1, wherein the predetermined criterion comprises at least one of a type, a time of occurrence, or a speaker of the conversation information.

4. The method of claim 1, wherein the predetermined criterion comprises continuity of the conversation information, the continuity determined based on an interval between a time of occurrence of previous conversation information and a time of occurrence of next conversation information.

5. The method of claim 1, further comprising:
    receiving an input for using an emoticon from the user.

6. The method of claim 1, wherein the at least one emoticon is displayed to replace the basic keyword interface in a region where the basic keyword interface is displayed.

7. The method of claim 1, further comprising:
    receiving an input of selecting at least one conversation information from among the conversation information from the user,
    wherein the at least one conversation information is selected as the base conversation information.

8. The method of claim 1, further comprising:
    displaying, in the chat room, conversation information comprising a basic keyword corresponding to the selected basic keyword interface so that the conversation information is distinguishable from other conversation information.

9. The method of claim 1, further comprising:
    receiving update information of the keyword database; and
    updating the keyword database with the update information.

10. The method of claim 9, further comprising:
    selecting, as an additional suggested keyword, a keyword that is included in the base conversation information, used more than a predetermined number of times, but not included in the keyword database; and
    transmitting information on the additional suggested keyword to the server,
    wherein the update information comprises information on the additional suggested keyword.

11. A non-transitory computer readable recording medium storing instructions, when executed by one or more processors, configured to perform the method of claim 1.

12. A user terminal performing a method for recommending emoticons, the user terminal comprising:
    a memory storing instructions; and
    a processor configured to execute the instructions to perform the method of claim 1.

13. A method for recommending emoticons by a server, the method comprising:
    storing a plurality of emoticons in a memory of the server, the plurality of emoticons associated with a plurality of keyword identifiers;
    providing a keyword database to a user terminal, the keyword database comprising the plurality of keyword identifiers and a plurality of basic keywords, the plurality of keyword identifiers respectively corresponding to the plurality of basic keywords, each of the plurality of basic keywords corresponding to one or more emoticons of the plurality of emoticons stored in a memory of the server;

providing a chat service application to the user terminal to cause the user terminal to:
  display conversation information in a chat room,
  select at least some of the conversation information as base conversation information based on a predetermined criterion,
  compare the base conversation information with the plurality of basic keywords of the keyword database to select a basic keyword of the plurality of basic keywords corresponding to the base conversation information,
  retrieve a keyword identifier, corresponding to the selected basic keyword, from the plurality of keyword identifiers of the keyword database stored in a memory of the user terminal,
  display a basic keyword interface corresponding to the selected basic keyword, and
  display an extended keyword interface corresponding to an extended keyword having predetermined relevance to the basic keyword;
receiving, from the user terminal, a request for at least one emoticon of the plurality of emoticons associated with at least one of the basic keyword interface or the extended keyword interface, without receiving the conversation information for recommending emoticons from the user terminal;
retrieving, from the memory of the server, the at least one emoticon associated with the at least one of the basic keyword interface or the extended keyword interface received from the user terminal; and
transmitting, to the user terminal, the retrieved at least one emoticon to cause the user terminal to display the at least one emoticon on the user terminal as a recommendation to a user of the user terminal.

* * * * *